United States Patent [19]
Watanabe

[11] Patent Number: 6,097,150
[45] Date of Patent: Aug. 1, 2000

[54] IONIZABLE GAS FOR A PLASMA DISPLAY

[75] Inventor: Shinji Watanabe, Aichi, Japan

[73] Assignee: Sony Corporation, Tokyo, Japan

[21] Appl. No.: 09/195,676

[22] Filed: Nov. 18, 1998

[30]    Foreign Application Priority Data

Nov. 19, 1997  [JP]   Japan ................................. 9-335145

[51] Int. Cl.[7] .................................................. H01J 17/49
[52] U.S. Cl. ........................... 313/582; 313/584; 313/585
[58] Field of Search ..................................... 313/583, 582, 313/584, 585, 586

[56]               References Cited

U.S. PATENT DOCUMENTS 5,714,841  2/1998  Miyazaki ................................ 313/585
5,982,095  11/1999  Jin et al. ................................ 313/582

*Primary Examiner*—Nimeshkumar D. Patel
*Assistant Examiner*—Todd Reed Hopper
*Attorney, Agent, or Firm*—Hill & Simpson

[57]          ABSTRACT

A display cell has an upper substrate joined to an intermediate substrate with a specific gap put therebetween; an optoelectric material kept in the gap, and signal electrodes formed on the upper substrate in rows to which are applied image signals. A plasma cell has a lower substrate joined to the intermediate substrate with a specific gap put therebetween for forming an enclosed space, an ionizable gas which fills the enclosed space, and scanning electrodes formed on the lower substrate in columns to generate a plasma discharge. The scanning electrodes are scanned in sequence to write image signals applied to the signal electrodes in the optoelectric material. The gas for generating plasma discharge is composed of a mixture containing an inert component such as Kr or Xe as a main component and a hydrogen component. The inert gas changes, when electric discharging is started, from the ground state to the excited state, and changes, when the electric discharging is stopped, from the excited state to the ground state while being partially kept in a metastable state for a short time. The hydrogen component acts to quickly quench the metastable state of the inert element to accelerate the decay of the electric discharge, thereby making the sequential scanning of the scanning electrodes faster.

9 Claims, 6 Drawing Sheets

| GASES | METASTABLE LEVELS (eV) |
|---|---|
| He | 20.9 |
| Ne | 16.7 |
| Ar | 11.7 |
| Kr | 10.5 |
| Xe | 9.4 |
| Hg | 5.5 |
| N | 3.6 |
| O | 4.2 |

IONIZABLE GAS FOR A PLASMA DISPLAY

BACKGROUND OF THE INVENTION

The present invention relates to a display making use of plasma discharge, and particularly to a composition of an ionizable gas which fills a plasma cell of the display.

A feature of a display making use of plasma discharge is its flat structure. As such a display, there are known a PDP (plasma display panel) and a PALC (plasma addressed liquid crystal display). The PDP generates a display by exciting a fluorescent substance with the aid of plasma discharge. The PALC is a type of addressing of an optoelectric material such as liquid crystal with the aid of plasma discharge, as disclosed, for example, in Japanese Patent Laid-open No. Hei.4-265931. The plasma addressed liquid crystal display basically includes a flat panel structure having a display cell and a plasma cell which are stacked on each other with an intermediate substrate put therebetween. The display cell has an upper substrate joined to the intermediate substrate with a specific gap put therebetween, an optoelectric material such as liquid crystal kept in the gap, and signal electrodes formed on the upper substrate in rows to be applied with image signals. The plasma cell has a lower substrate joined to the intermediate substrate with a specific gap put therebetween for forming an enclosed space, an ionizable gas which fills the space, and scanning electrodes formed on the lower substrate in columns to ionize the gas filled in the space and generate electric discharge in the space. The scanning electrodes are scanned in sequence to write image signals applied to the signal electrodes in the optoelectric material.

In the plasma cell, a discharge voltage is applied between adjacent scanning electrodes, having opposed polarities, to ionize a gas and generate plasma discharge. To perform fast line-sequential scanning of the plasma cell, it is required that plasma discharge is generated quickly in response to application of a discharge voltage and that the plasma discharge decays quickly in response to the release of the discharge voltage. As an ionizable gas, an inert gas such as helium or neon has been used. Such a gas changes between the ground state and the excited state in response to application/release of a discharge voltage. The gas such as helium or neon, however, has a metastable state between the ground state and the excited state, and a part of the gas returns from the excited state to the ground state by way of the metastable state. This causes a problem that the decay of the plasma discharge is retarded, which makes it impossible to make the line-sequential scanning of a plasma cell faster. In particular, in the case of using a plasma cell for a monitor of a personal computer complying with an XGA standard or for a television monitor complying with an HDTV standard, there occurs a problem that fast line-sequential scanning, which is necessary for the monitor of this type, is obstructed by retardation of the decay of plasma discharge resulting from the above-described metastable state. The retardation of the decay of the plasma discharge causes initiation of the next operation of scanning electrodes in a state in which writing of image signals are not completed yet, and accordingly, it becomes difficult to carry out sufficient writing, thereby degrading the display contrast. Also the retardation of the decay of plasma discharge applies an unnecessary offset potential to the optoelectric material, resulting in a so-called burning in of a display screen.

SUMMARY OF THE INVENTION

An object of the present invention is to provide a display making use of plasma discharge, which is capable of making faster sequential scanning of scanning electrodes of the display, thereby allowing high-speed operation of the display.

To achieve the above object, according to one aspect of the present invention, there is provided a display including: a pair of substrates joined to each other with a specific gap put therebetween for forming an enclosed space; an ionizable gas which fills the space; and electrodes formed on at least one of the pair of substrates to ionize the gas and generate electric discharge in the space. It is to be noted that the gas is composed of a mixture containing an inert element as a main component and a hydrogen component; the display is characterized in that the inert component changes, when electric discharging is started, from the ground state to the excited state, and changes, when the electric discharging is stopped, from the excited state to the ground state while being partly kept in a metastable state for a short time; and the hydrogen component acts to quickly quench the metastable state of the inert component, thereby accelerating the decay of the electric discharge. The inert component is preferably selected from at least one kind of groups consisting krypton and xenon. The hydrogen component is preferably contained in the gas in the form of hydrogen gas at a concentration of 0.01% to 20%. The enclosed space preferably contains a hydrogen absorbing material for keeping a partial pressure of the hydrogen gas.

The present invention can be applied not only to the above-described ordinary PDP (plasma display panel) but also to a PALC (plasma addressed liquid crystal display). That is to say, according to another aspect of the present invention, there is provided a display basically including a flat panel structure having a display cell and a plasma cell which are stacked on each other with an intermediate substrate put therebetween; wherein the display cell including: an upper substrate joined to the intermediate substrate with a specific gap put therebetween; an optoelectric material kept in the gap; and signal electrodes formed on the upper substrate in columns to be applied with image signals; the plasma cell including: a lower substrate joined to the intermediate substrate with a specific gap put therebetween for forming an enclosed space; an ionizable gas which fills the space; and scanning electrodes formed on the lower substrate in rows to ionize the gas and generate electric discharge in the space; and the scanning electrodes are scanned in sequence to write image signals applied to the signal electrodes in the optoelectric material. It is to be noted that the gas is composed of a mixture containing an inert element as a main component and a hydrogen element; the inert element changes, when electric discharging is started, from the ground state to the excited state, and changes, when the electric discharging is stopped, from the excited state to the ground state while being partially kept in a metastable state for a short time; on the contrary, the hydrogen component acts to quickly quench the metastable state of the inert component, to accelerate the decay of the electric discharge, thereby making the sequential scanning of the scanning electrodes faster. Preferably, a partial pressure P of the inert component satisfies a relationship given by $0.02 \leq P \cdot d \leq 3$ [Pa·m] where d is a gap between two adjacent scanning electrodes, having opposed polarities.

According to the present invention, a mixed gas containing an inert component as a main component and a hydrogen component is used as a gas for generating plasma discharge. The addition of the hydrogen element is effective to quickly quench the metastable state of the inert component such as krypton or xenon. Further the hydrogen component is added in the form of hydrogen gas ($H_2$), which has no metastable state, and thereby it does not exert an adverse effect on the decay of plasma discharge and also does not cause unnecessary electric charges.

According to the present invention, since the decay characteristic of the plasma discharge is significantly improved, the contrast becomes higher even in the case of displaying an image created under the XGA standard or HDTV standard. The addition of hydrogen gas is effective to stabilize electric discharge, to suppress abnormal discharge, thereby prolonging the service life of the plasma cell. Since a change in operational voltage of plasma discharge or in discharge current with elapsed time is made smaller, it is easy to control the plasma discharge. The stabilization of electric discharge is effective to reduce occurrence of uneven image. In addition, since power consumption is reduced, overheat of the plasma cell can be correspondingly suppressed.

DETAILED DESCRIPTION OF THE PREFERRED EMBODIMENT

Figure 1:
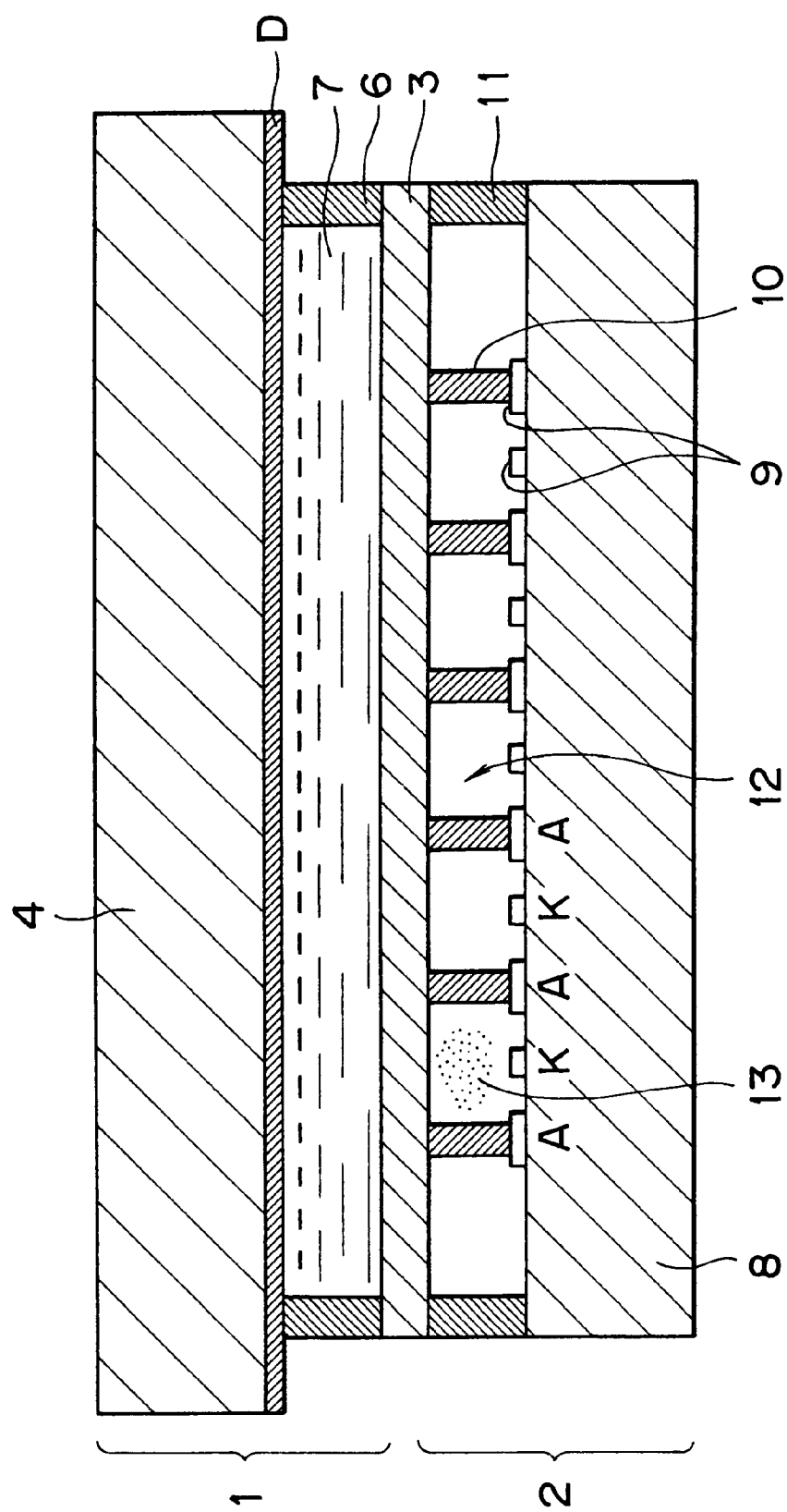
FIG. 1 is a sectional view showing a configuration of a display of the present invention.

Hereinafter, an embodiment of the present invention will be described with reference to the accompanying drawings. FIG. 1 is a typical sectional view showing a configuration of a display according to the present invention. The display according to this embodiment is of a plasma addressed type, however, the present invention is not limited thereto, but is applicable to a usual plasma display panel. Referring to FIG. 1, there is shown a plasma addressed liquid crystal display including a flat panel structure having a display cell 1 and a plasma cell 2 stacked on each other with an intermediate substrate 3 put therebetween. The intermediate substrate 3 is formed of a glass sheet. The display cell 1 includes a glass or the like upper substrate 4, and on the inner principal plane of which a plurality of signal electrodes D made from a transparent conductive film are formed in such a manner as to extend in parallel to each other in the row direction. The upper substrate 4 formed of a glass plate, or the like is adhesively bonded by means of a sealing material 6 on the intermediate substrate 3 with a specific gap put therebetween. The gap is filled with an optoelectric material 7 such as liquid crystal and then sealed.

The plasma cell 2 includes a glass or the like lower substrate 8 on the inner principal plane on which scanning electrodes 9 are formed in such a manner as to extend in the column direction, that is, orthogonally to the signal electrodes D. The scanning electrodes 9 are composed of anodes A and cathodes K alternately arranged. Between the anode A and cathode K is generated a plasma discharge. A partition wall 10 is formed in contact with a part of each anode A in such a manner as to extend along the anode A. The vertex of the partition wall 10 is in contact with the intermediate substrate 3, and consequently the partition wall 10 serves as a spacer. The lower substrate 8 is joined on the intermediate substrate 3 by means of glass frit 11. An air-tight enclosed space is formed between the lower substrate 8 and the intermediate substrate 3. The enclosed space is formed, by the partition walls 10, into discharge channels 12 arranged in rows. The enclosed space is filled with an ionizable gas 13 for generating a plasma discharge. As is apparent from FIG. 1, one discharge channel 12 is composed of the cathode K positioned at the center of the discharge channel 12 and the anodes A positioned on both sides of the cathode K. When a discharge voltage is applied between the adjacent cathode K and each anode A having opposed polarities, the gas 13 is ionized and the inside of the discharge channel 12 is filled with plasma. In addition, the present invention is not limited to the structure of the plasma cell 2 shown in FIG. 1, but also is applicable to, for example, the partition walls 10 being directly formed on the lower substrate 8 and a pair of the anode A and cathode K parallel to each other being arranged in the discharge channel 12 surrounded by the pair of the partition walls 10.

In the plasma addressed liquid crystal display having the above configuration, pixels are defined at crossing points between rows of the signal electrodes D and columns of the discharge channels 12. The plasma addressed liquid crystal display is driven by scanning columns of the discharge channels 12 for generating plasma discharge while switching the scanning in a line sequence, and applying image signals to rows of the signal electrodes D on the display cell 1 side in synchronization with the scanning. When plasma is generated in the discharge channel 12, the inside of the discharge channel 12 is caused to have a substantially uniform anode potential, thus effecting pixel selection for each column. That is to say, the discharge channel 12 functions as a sampling switch. When an image signal is applied to each pixel in the state in which the plasma sampling switch is turned on, sampling is effected to control lighting-up/extinguishing of the pixel. After the plasma sampling switch is turned off, the image signal is held in the pixel as it is.

As a feature of the present invention, the gas 13 for generating electric discharge is composed of a mixture containing an inert component as a main component and a hydrogen component. The inert component changes, when electric discharging is started, from the ground state to the excited state, and changes, when the electric discharging is stopped, from the excited state to the ground state while being partly kept in a metastable state for a short time. The hydrogen component acts to quickly quenches the metastable state of the inert component, to accelerate the decay of the electric discharge, thus making the sequential scanning of the scanning electrodes 9 faster. The inert component is preferably selected from at least one kind of groups consisting krypton (Kr) and xenon (Xe). The hydrogen component is preferably contained in the gas in the form of hydrogen gas ($H_2$) at a concentration of 0.01% to 20%. The enclosed space of the plasma cell 2 preferably contains a hydrogen absorbing material for keeping a partial pressure of the hydrogen gas. The hydrogen gas $H_2$ gradually disappears with elapsed time because it is implanted in the scanning electrodes 9 or the like by the plasma discharge. To cope with such an inconvenience, the above hydrogen absorbing material is arranged in the plasma cell 2. with this arrangement of the hydrogen absorbing material, the concentration of the hydrogen gas can be kept stable by making use of the reversible reaction of the hydrogen absorbing mechanism. The hydrogen absorbing material is represented by a hydrogen absorbing alloy containing Ti, Ni, Zr and the like. The hydrogen absorbing alloy may be arranged integrally with or separately from the scanning electrodes 9. Further, a partial pressure P of the inert gas is preferably adjusted to satisfy a relationship of $0.02 \leq P \cdot d \leq 3$ [Pa·m] where d indicates a gap between the adjacent scanning electrodes, having opposed polarities (that is, the anode A and the cathode K adjacent to each other).

Figures 2, 3:
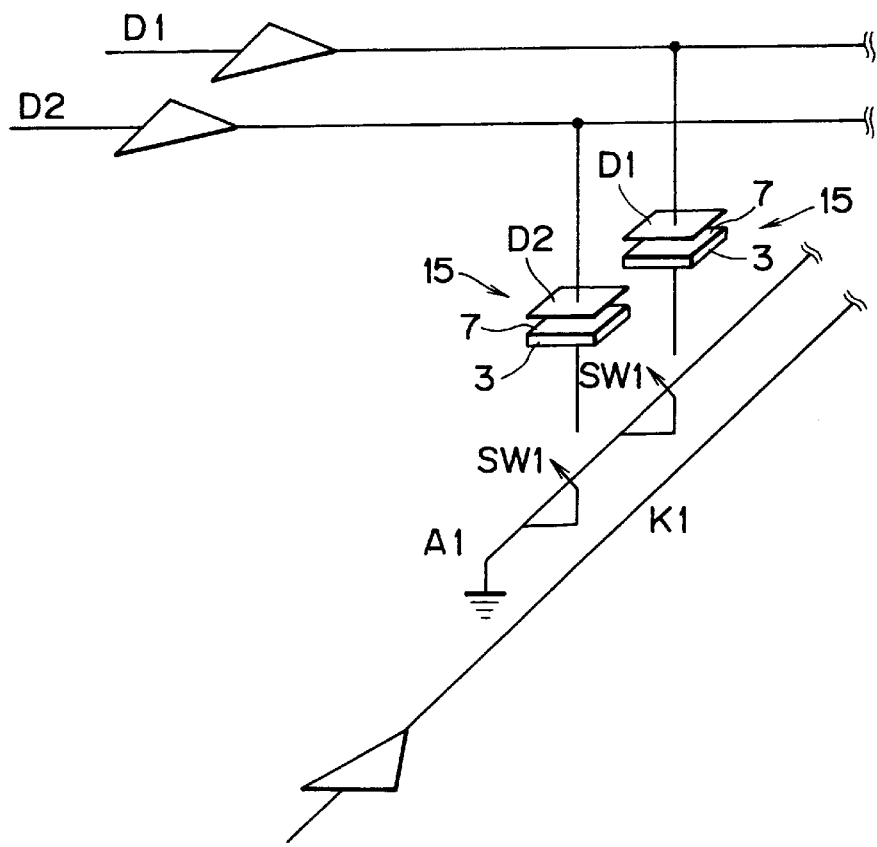
FIG. 2 is a diagram showing metastable levels of various gases.
FIG. 3 is a typical diagram illustrating the operation of the display shown in FIG. 1.

FIG. 2 is a diagram showing metastable levels of various gases. In FIG. 2, the selected kinds of the gases are He, Ne, Ar, Kr, Xe, Hg, N and O, and the metastable level is expressed in the unit of eV. When a high voltage is applied, each of these gases changes from the ground state to the excited state; and when the high voltage applied to the gas is removed, the gas returns from the excited state to the ground state. In general, the excited state is extremely unstable, therefore, it returns to the original ground state within a period of time as very short as $10^{-8}$ seconds or less. In the excited state, however, there are few very stable states having a life of $10^{-4}$ to $10^{-2}$ seconds. This stable state is called as a metastable state. The metastable level in FIG. 2 means the energy level of the metastable state. An ionized element cannot directly return from the metastable state to the ground state, and it has to collide with other molecules, atoms or a wall of an enclosed chamber to effect a change. The presence of the metastable state retards the decay of the plasma discharge, to thereby hinder fast scanning. Particles in a metastable state are ionized with a very small energy, and thereby they act to destroy data upon a writing operation of image signals in the plasma addressed liquid crystal display. In view of the foregoing, as a gas for generating a plasma discharge, there may be selected a kind of gas having as short as possible a residence time in the metastable state. With attention given to the various inert gases shown in FIG. 2, Kr and Xe have a short residence time in the metastable state as compared with He, Ne and Ar. For this reason, in the embodiment shown in FIG. 1, there is used at least one inert element selected from a group consisting of krypton (Kr) and xenon (Xe) as a gas for generating plasma discharge.

According to the present invention, to further shorten the decay of plasma discharge, a hydrogen component is added to the above-described inert component in the form of hydrogen gas $H_2$. The hydrogen gas $H_2$ acts to quickly quench the metastable state of Kr or Xe. On the other hand, the hydrogen gas $H_2$ itself has no metastable state, and thereby it does not generate unnecessary electric charges exerting adverse effect on writing of the image signals. The hydrogen gas is preferably mixed with an inert component at a concentration of 0.01% to 20%. If the concentration of the hydrogen gas is 0.01% or less, the above quenching function of the hydrogen gas is insufficient and also the presence of the hydrogen gas becomes unstable because of a gradual disappearance of the hydrogen gas with elapsed time. If it is more than 20%, the generation of plasma discharge becomes unstable. In addition, the presence of the hydrogen gas at a concentration of 20% or less presents no risk of explosion of the hydrogen gas. Further, letting d be a gap between the adjacent anode A and cathode K having opposed polarities and P be a partial pressure of an inert element, a value of P·d is preferably in a range of 0.02 (Pa·m) to 3 (Pa·m). If the value of P·d is more than 3 (Pa·m), the extension of the plasma discharge in the discharge channel 12 becomes insufficient, to thereby make the electric discharging state unstable. This is experimentally confirmed. If the value of P·d is less than 0.02 (Pa·m), the decay time of plasma discharge becomes longer than 50 μs. This is impractical in actual use. For example, when an image of a double-speed NTSC type is displayed on a display, a scanning time allocated for one line of the discharge channel is about 30 μs. Accordingly, in this case, when the value P·d is less than 0.02 (Pa·m), the decay time (more than 50 μs) becomes longer than the scanning time (30 μs), and consequently, it is difficult to write an image signal for one line at a high speed.

To confirm the effect of the present invention, a sample of the plasma addressed liquid crystal display, which are actually prepared in accordance with the present invention, was subjected to an operation test. Prior to description of the test result, the operation of a plasma addressed liquid crystal display will be described in detail for ease of understanding. FIG. 3 is a typical view showing only two pixels of the plasma addressed liquid crystal display. In this figure, there are shown only two signal electrodes D1 and D2, one cathode K1, and one anode A1 for an easy understanding. Each pixel 15 has a stacked structure having the signal electrode D1 or D2, an optoelectric material 7, an intermediate substrate 3, and a discharge channel. During generation of a plasma discharge, the discharge channel is substantially connected to an anode potential. When an image signal is applied to the pixel in such a state, electric charges are injected to the optoelectric material 7 and the intermediate substrate 3. On the other hand, after completion of the plasma discharging, the discharge channel is returned to the insulating state, that is, allowed to have a floating potential, so that the injected electric charges are held in each pixel 15. In this way, a so-called sample and hold operation is performed. The discharge channel functions as a sampling switch element provided for each pixel 15, and therefore, it is typically indicated by switch symbol SW1. Meanwhile, the optoelectric material 7 and the intermediate substrate 3, which are held between the signal electrode (D1 or D2) and the discharge channel, function as a sampling capacitor. When the sampling switch SW1 is turned on by scanning in a line sequence, an image signal is held in the sampling capacitor, to operate lighting-up/extinguishing of each pixel depending on the signal voltage level. After the sampling switch SW1 is turned off, the signal voltage is held in the sampling capacitor, thus effecting active matrix operation of the display.

Figure 4:
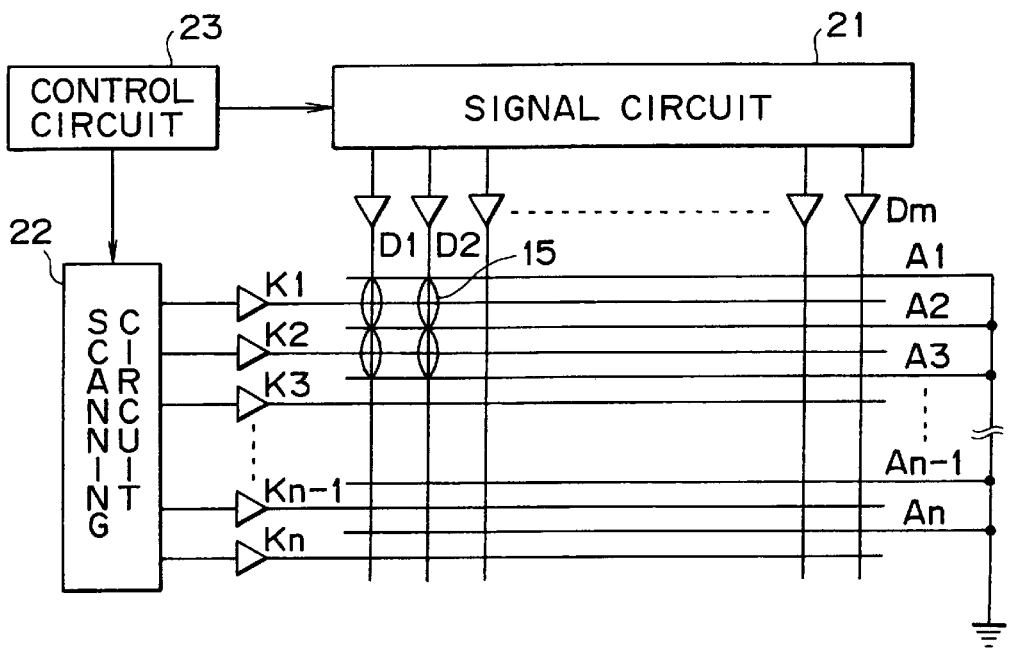
FIG. 4 is a typical diagram showing a configuration of a drive circuit of the display shown in FIG. 1.

FIG. 4 shows a configuration of a drive circuit connected to the above-described plasma addressed liquid crystal display. As shown in FIG. 4, the drive circuit includes a signal circuit 21, a scanning circuit 22, and a control circuit 23. A plurality of signal electrodes D1 to Dm are connected to the signal circuit 21 via buffers. Meanwhile, cathodes K1 to Kn are connected to the scanning circuit 22 via buffers. Anodes A1 to An are grounded. The signal circuit 21 and the scanning circuit 22 are controlled by the control circuit 23 in such a manner as to be synchronized with each other. The cathodes K1 to Kn are selected in a line sequence by the scanning circuit 22. For example, when the cathode K1 is selected, a plasma discharge is generated between the cathode K1 and the anodes A1 and A2, both adjacent to the cathode K1, to form a local discharge region. Such a discharge region constitutes a column scanning unit which corresponds to the discharge channel 12. On the other hand, an image signal pulse is applied to each of the signal electrodes D1 to Dm in synchronization with the line-sequential scanning. Each of the signal electrodes D1 to Dm constitutes a row drive unit. Each pixel 15 is defined at a crossing point between the row drive unit and the column scanning unit.

Figure 5:
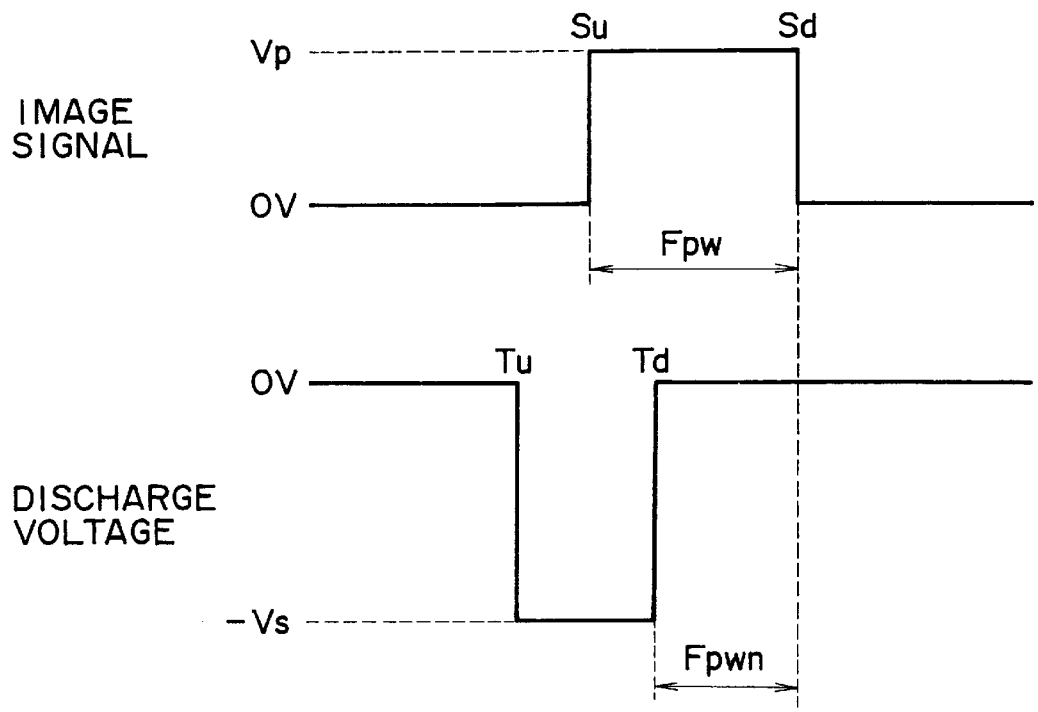
FIG. 5 is a diagram showing waveforms of an image signal and a discharge voltage for explaining the operation of the display shown in FIG. 1.

The operation of the plasma addressed liquid crystal display will be described with reference to FIG. 5. FIG. 5 shows an output timing of an image signal and a discharge voltage for one pixel. The discharge voltage is raised, at a timing Tu, from a ground potential (0 V) to a specific negative potential −Vs. As a result, a plasma discharge is generated in the discharge channel, so that the inside of the discharge channel is filled with electrically charged particles and is allowed to have a ground potential excluding the vicinity of the cathode. After an elapse of a specific scanning period, the discharge voltage falls into the ground potential at a time Td. Thus the plasma discharge in the discharge channel is completed. However, after completion of the plasma discharge, particles remain in a metastable state and are gradually reduced from the metastable state, and eventually the inside of the discharge channel reaches becomes a high resistance state. On the other hand, a rising timing Su of an image signal is set at a point immediately before the falling timing Td of the discharge voltage, and a falling timing Sd is set at a point after the falling timing Td of the discharge voltage. A pulse width Fpw of the image signal is set in a range of 10 $\mu$s to 20 $\mu$s. A voltage Vp of the image signal varies in a range of 0 V to 80 V depending on display data to be written in the pixel. In the case of a normally white mode, by applying an image signal at 80 V, the transmittance of a pixel changes from 100% a (white state) to 0% a (black state). Ideally, the voltage Vp of the image signal is sampled at the falling timing Td of the discharge voltage and is written in the pixel. However, the writing of the image signal cannot be instantly practically performed because of the decay time of plasma discharge. Accordingly, for making writing of an image signal faster, it is very important to make the decay time of the plasma discharge be as short as possible. It is required that sampling is at least perfectly completed within a period of time Fpwn between the falling timing Td of the discharge voltage and the falling timing Sd of the image signal.

Figure 6:
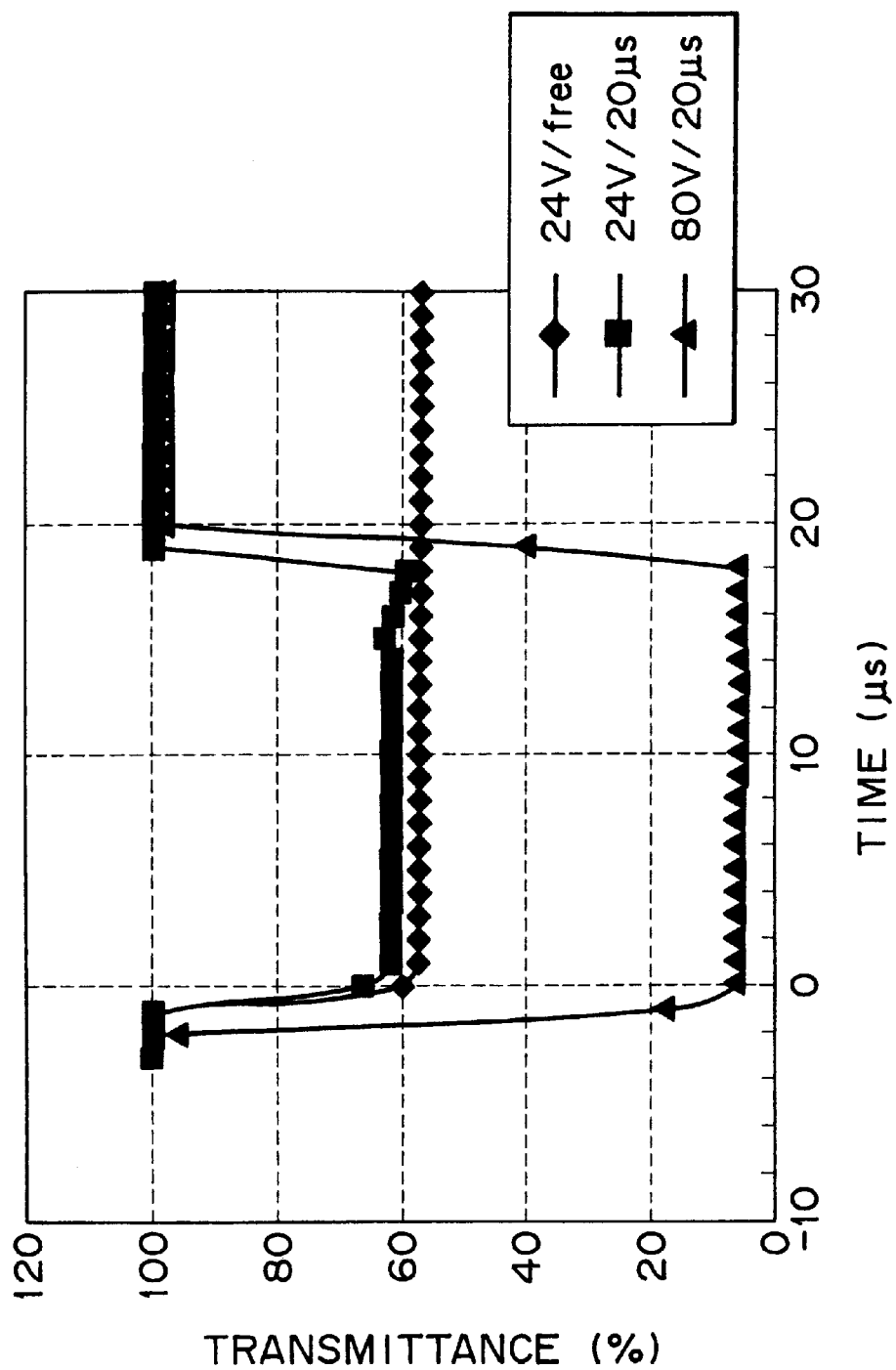
FIG. 6 is a graph showing a transmittance characteristic of an example of the display of the present invention.

FIG. 6 is a graph showing the results of an operation test with a sample of the plasma addressed liquid crystal display prepared in accordance with the present invention. In the figure, the ordinate indicates the transmittance (%) and the abscissa indicates an elapsed time ($\mu$s). The elapsed time is measured on the basis of the falling timing Td of the discharge voltage. The sample has a diagonal dimension of 5 inches, and uses a mixture of Xe and 10% of $H_2$ as a gas for generating plasma discharge. A partial pressure P of Xe is 2666 Pa. The gap d between the adjacent anode A and cathode K is set at 150 $\mu$m. In this case, the value P·d becomes about 0.4 (Pa·m). A discharge voltage is Vs=470 V, and a discharge current is 7 mA. Three image signals under different conditions; (1) Vp=24 V, Fpw=infinity (free), (2) Vp=24, Fpw=20 $\mu$s, and (3) Vp=80 V, Fpw=20 $\mu$s, are applied. As is apparent from the graph shown in FIG. 6, the image signal is quickly written in the pixel. The profile of the change in transmittance of the pixel substantially corresponds to the profile of the image signal. Thus the image signal is written with a very good responsiveness. By use of the gas containing Xe as a main component and $H_2$ is effective to significantly shorten the decay time of plasma discharge.

Figure 7:
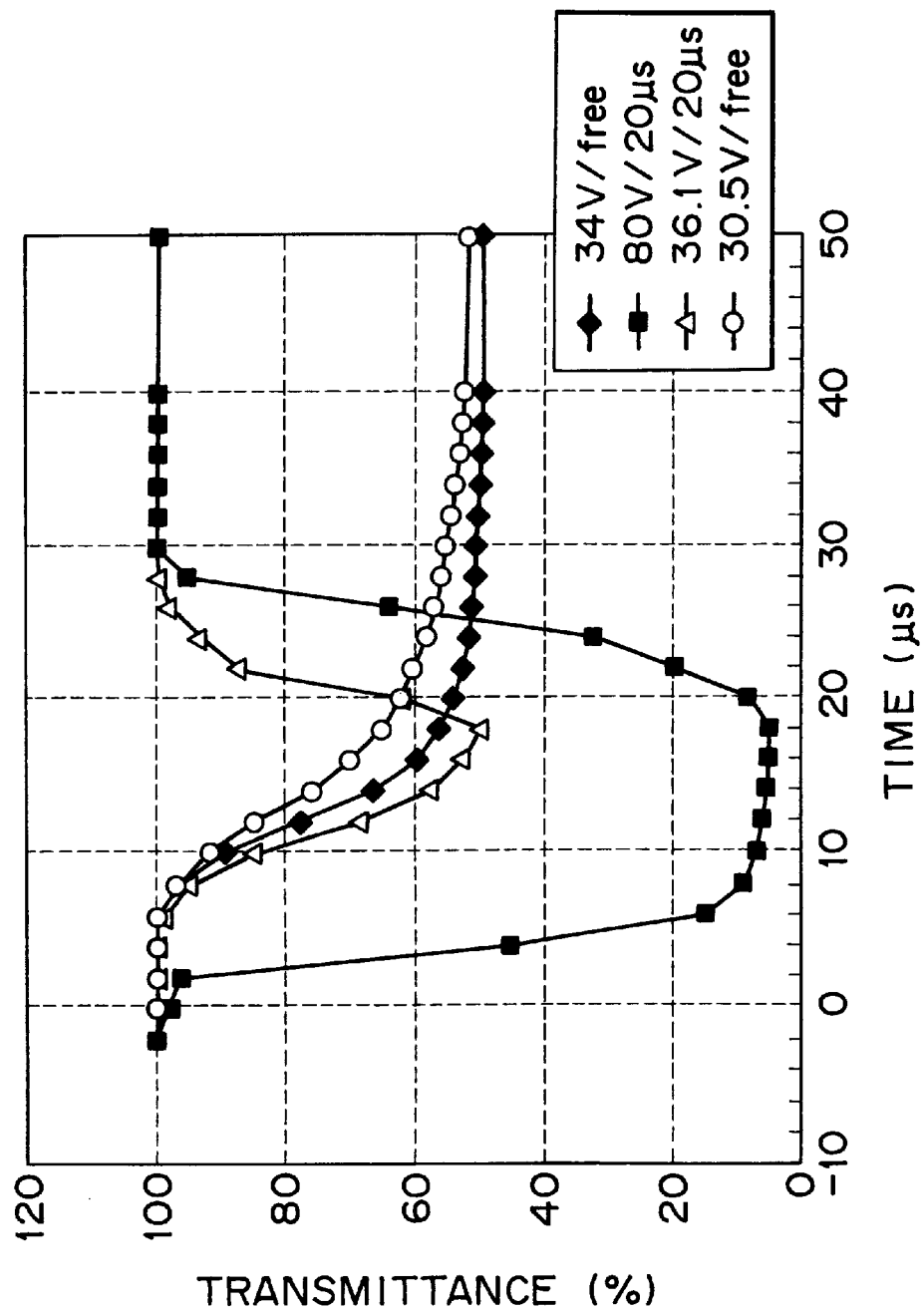
FIG. 7 is a graph showing a change in transmittance of a comparative display.

FIG. 7 is a graph showing results of an operation test for a comparative example. In this comparative example, 100% Xe is used as a gas for generating a plasma discharge, and the gas pressure is set at 3333 Pa. Four image signals under different conditions: (1) Vp=34 V, Fpw=infinity, (2) Vp=80 V, Fpw=20 $\mu$s, (3) Vp=36.1 V, Fpw=20 $\mu$s, and (4) Vp=30.5 V, Fpw=infinity, are applied, and a change in transmittance of the pixel with elapsed time is measured. As is apparent from the graph shown in FIG. 7, the change in transmittance with elapsed time does not follow the image signal. In particular, in the case of writing an intermediate potential of about 30 V, it takes a period of time of 20 to 30 as until the transmittance reaches the target value of 60%.

Figure 8:
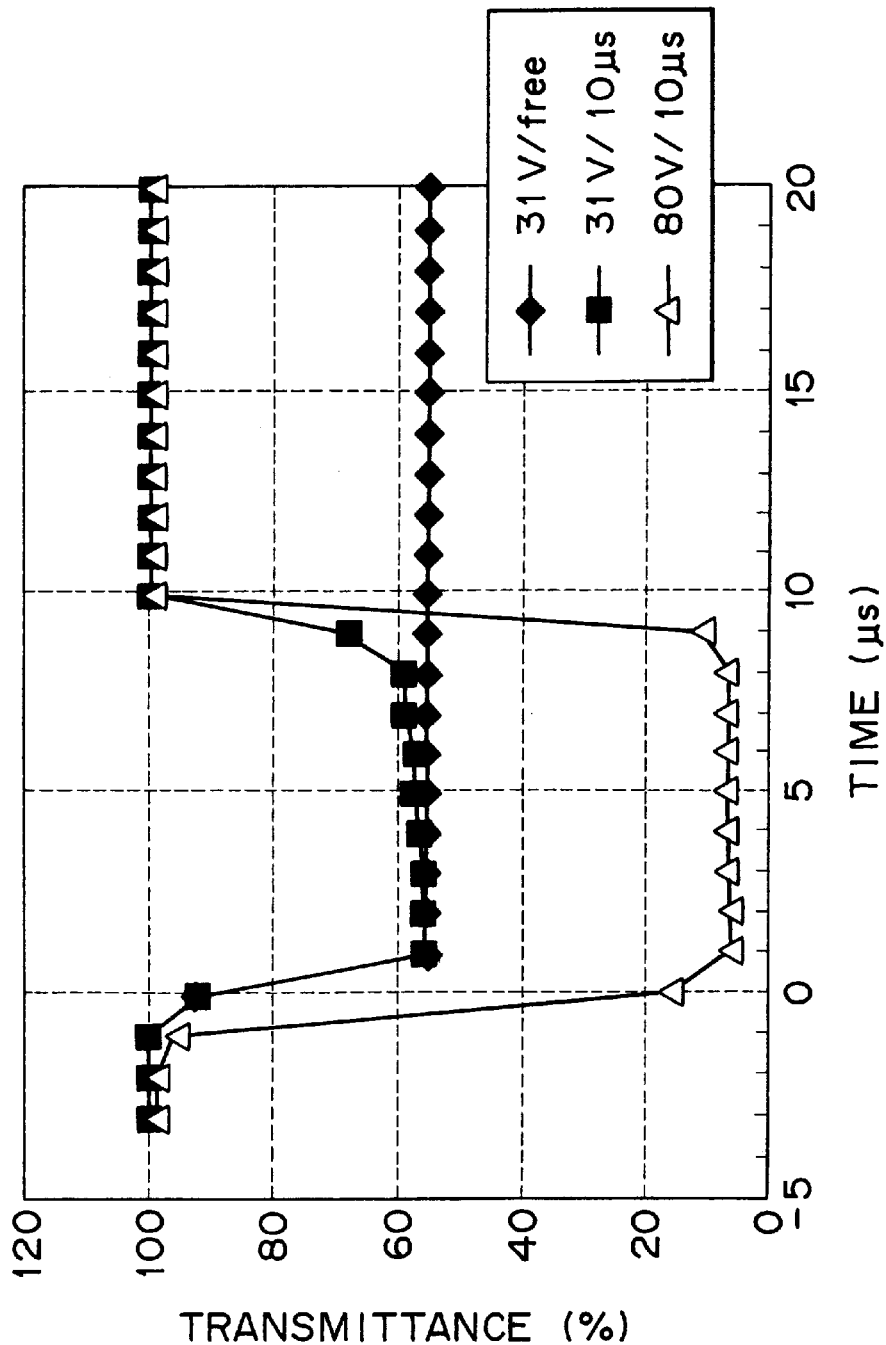
FIG. 8 is a graph showing a transmittance characteristic of another example of the display of the present invention.

FIG. 8 is a graph showing the results of an operation test for another sample of the plasma addressed liquid crystal display prepared in accordance with the present invention. This example uses a mixture of Kr and 10% of $H_2$ as a gas for generating plasma discharge. A partial pressure of Kr is set at 2666 Pa. The gap d between the adjacent anode A and cathode K is set at 150 $\mu$m. In this case, the value of P·d becomes about 0.4 (Pa·m). A discharge voltage is Vs=400 V, and a discharge current is about 16 mA. Three image signals under different conditions: (1) Vp=31 V, Fpw=infinity, (2) Vp=31 V, Fpw=10 $\mu$s, and (3) Vp=80 V, Fpw=10 $\mu$s, are applied. As is apparent from the graph shown in FIG. 7, the change in transmittance with elapsed time is extremely fast, and it substantially perfectly follows the change in voltage of the image signal.

Although other modifications and changes may be suggested by those skilled in the art, it is the intention of the inventors to embody within the patent warranted hereon all changes and modifications as reasonably and properly come within the scope of their contribution to the art.

What is claimed is:

1. A plasma addressed electro optical display, comprising:
   a plasma chamber including;
   a pair of substrates joined to each other with a specific gap put therebetween for forming an enclosed space;
   an ionizable gas which fills said enclosed space; and
   electrodes formed on at least one of said pair of substrates to ionize said ionizable gas and generate an electric discharge in said enclosed space,
   a liquid crystal chamber on said plasma chamber, the liquid crystal layer including;
   a third substrate spaced from said plasma chamber by a predetermined space;
   a liquid crystal material in said predetermined space,
   data electrodes formed on said third substrate and extending at right angles to said electrodes in said plasma chamber,
   said ionizable gas being composed of a mixture containing an inert component as a main component and a hydrogen component;
   said inert component changes, when the electric discharging is started, from a ground state to an excited state, and changes, when the electric discharge is stopped, from the excited state to the ground state while being partly kept in a metastable state for a short time; and
   said hydrogen component acts to quickly quench the metastable state of said inert component, thereby accelerating decay of the electric discharge.

2. A display according to claim 1, wherein said inert component is selected from a group consisting of krypton and xenon.

3. A display according to claim 1, wherein said hydrogen component is contained in said gas in a form of hydrogen gas at a concentration of 0.01% to 20%.

4. A display according to claim 3, wherein said enclosed space contains a hydrogen absorbing material for keeping a partial pressure of said hydrogen gas.

5. In a display including a flat panel structure having a display cell and a plasma cell which are stacked on each other with an intermediate substrate put therebetween;

wherein said display cell comprises: an upper substrate jointed to said intermediate substrate with a specific gap put therebetween; an optoelectric material kept in said gap; and signal electrodes formed on said upper substrate in columns to which are applied image signals;

said plasma cell comprising: a lower substrate joined to said intermediate substrate with a specific gap put therebetween for forming an enclosed space; and ionizable gas which fills said enclosed space; and scanning electrodes formed on said lower substrate in rows to ionize said gas and generate electric discharge in said enclosed space; and said scanning electrodes are scanned in sequence to write image signals applied to said signal electrodes in said optoelectric material;

the improvement comprising;

said gas being composed of a mixture containing an inert component as a main component and a hydrogen component;

said inert component changes, when an electric discharge is started, from ground state to an excited state, and changes, when the electric discharge is stopped, from the excited state to the ground state while being partly kept in a metastable state for a short time; and said hydrogen component acts to quickly quench the metastable state of said inert component, to accelerate decay of the electric discharge, thereby making sequential scanning of said scanning electrodes faster.

6. A display according to claim 5, wherein said inert component is selected from a group consisting of krypton and xenon.

7. A display according to claim 5, wherein said hydrogen component is in said gas in a form of hydrogen gas at a concentration of 0.01% to 20%.

8. A display according to claim 7, wherein said enclosed space contains a hydrogen absorbing material for keeping a partial pressure of said hydrogen gas.

9. A display according to claim 5, wherein a partial pressure P of said inert component satisfies a relationship given by $$0.02 \text{ Pa·m} \leq P \cdot d \leq 3 \text{ [Pa·m]}$$

where d is a gap between two adjacent ones of said scanning electrodes, said two adjacent ones of said scanning electrodes being at opposite polarities.

* * * * *